(12) United States Patent
Thiesson et al.

(10) Patent No.: US 8,015,129 B2
(45) Date of Patent: Sep. 6, 2011

(54) PARSIMONIOUS MULTI-RESOLUTION VALUE-ITEM LISTS

(75) Inventors: Bo Thiesson, Woodinville, WA (US); Roland Franz Memisevic, Toronto (CA)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 12/102,453

(22) Filed: Apr. 14, 2008

(65) Prior Publication Data

US 2009/0259679 A1     Oct. 15, 2009

(51) Int. Cl.
G06F 15/18     (2006.01)

(52) U.S. Cl. .......................................... 706/14

(58) Field of Classification Search ................. None
See application file for complete search history.

(56) References Cited

U.S. PATENT DOCUMENTS

| | | | |
|---|---|---|---|
| 5,303,150 A | 4/1994 | Kameda |
| 5,386,556 A | 1/1995 | Hedin et al. |
| 5,485,372 A | 1/1996 | Golding et al. |
| 5,655,129 A | 8/1997 | Ito |
| 5,734,749 A | 3/1998 | Yamada et al. |
| 5,787,422 A | 7/1998 | Tukey et al. |
| 5,832,478 A | 11/1998 | George |
| 5,896,321 A | 4/1999 | Miller et al. |
| 5,926,652 A | 7/1999 | Reznak |
| 5,963,671 A | 10/1999 | Comerford et al. |
| 6,141,655 A | 10/2000 | Johnson et al. |
| 6,339,776 B2 | 1/2002 | Dayani-Fard et al. |
| 6,377,965 B1 | 4/2002 | Hachamovitch et al. |
| 6,408,266 B1 | 6/2002 | Oon |
| 6,424,358 B1 | 7/2002 | DiDomizio et al. |
| 6,490,563 B2 | 12/2002 | Hon et al. |
| 6,519,599 B1 | 2/2003 | Chickering et al. |
| 6,556,990 B1 | 4/2003 | Lane |
| 6,564,213 B1 | 5/2003 | Ortega et al. |
| 6,573,844 B1 | 6/2003 | Venolia et al. |
| 6,654,733 B1 | 11/2003 | Goodman et al. |
| 6,658,404 B1 | 12/2003 | Cecchini |
| 6,687,734 B1 | 2/2004 | Sellink et al. |
| 6,785,677 B1 | 8/2004 | Fritchman |
| 6,801,190 B1 | 10/2004 | Robinson et al. |

(Continued)

FOREIGN PATENT DOCUMENTS

EP     0924594 A2     6/1999

(Continued)

OTHER PUBLICATIONS

'Image Compression with Learnt Tree Structure Dictionaries': Monaci, 2004, IEEE, 0-7803-8578-0, pp. 35-38.*

(Continued)

Primary Examiner — Omar Fernandez Rivas
Assistant Examiner — Peter Coughlan
(74) Attorney, Agent, or Firm — Lee & Hayes, PLLC

(57) ABSTRACT

Systems and methods are provided for parsimonious representation of large sets of multi-resolution value-item lists. A hierarchical data structure associated with the lists and conditioning variables is learnt while exploiting both semantics encoded in target variables and a notion of nearness among nodes at the same detail level in the hierarchical data structure. Such a level of description can be dictated by a depth in a tree data structure. A compression scheme that relies on (i) a similarity metric and (ii) recursive greedy pairing of value-item lists in order to promote elements populating a specific tree node upwards in the tree facilitates a parsimonious representation of the compressed hierarchic structure.

20 Claims, 9 Drawing Sheets

U.S. PATENT DOCUMENTS

| | | | |
|---|---|---|---|
| 6,801,661 B1* | 10/2004 | Sotak et al. ............... 382/203 |
| 6,934,767 B1 | 8/2005 | Jellinek |
| 7,089,266 B2 | 8/2006 | Stolte et al. |
| 7,107,204 B1 | 9/2006 | Liu et al. |
| 7,133,876 B2 | 11/2006 | Roussopoulos et al. |
| 7,181,450 B2 | 2/2007 | Malloy et al. |
| 7,225,200 B2 | 5/2007 | Chickering et al. |
| 7,236,923 B1 | 6/2007 | Gupta |
| 7,277,029 B2 | 10/2007 | Thiesson et al. |
| 7,349,981 B2 | 3/2008 | Guerrero |
| 7,383,299 B1 | 6/2008 | Hailpern et al. |
| 7,395,203 B2 | 7/2008 | Wu et al. |
| 7,505,985 B2 | 3/2009 | Kilroy |
| 7,539,656 B2 | 5/2009 | Fratkina et al. |
| 7,617,205 B2 | 11/2009 | Bailey et al. |
| 7,769,804 B2 | 8/2010 | Church et al. |
| 2001/0048753 A1* | 12/2001 | Lee et al. ............... 382/103 |
| 2002/0099536 A1 | 7/2002 | Bordner et al. |
| 2002/0099581 A1 | 7/2002 | Chu et al. |
| 2002/0116528 A1 | 8/2002 | Vale |
| 2002/0123994 A1 | 9/2002 | Schabes et al. |
| 2002/0156779 A1 | 10/2002 | Elliott et al. |
| 2003/0061027 A1 | 3/2003 | Weise et al. |
| 2003/0212702 A1 | 11/2003 | Campos et al. |
| 2004/0201607 A1 | 10/2004 | Mulvey et al. |
| 2004/0260534 A1 | 12/2004 | Pak et al. |
| 2004/0267737 A1 | 12/2004 | Takazawa et al. |
| 2005/0050095 A1 | 3/2005 | Hurtis et al. |
| 2005/0144064 A1 | 6/2005 | Calabria et al. |
| 2005/0283468 A1 | 12/2005 | Kamvar et al. |
| 2006/0047701 A1 | 3/2006 | Maybury et al. |
| 2006/0085392 A1 | 4/2006 | Wang et al. |
| 2006/0123338 A1 | 6/2006 | McCaffrey et al. |
| 2006/0163337 A1 | 7/2006 | Unruh |
| 2006/0206454 A1 | 9/2006 | Forstall et al. |
| 2006/0290535 A1 | 12/2006 | Thiesson et al. |
| 2007/0011154 A1 | 1/2007 | Musgrove et al. |
| 2007/0136256 A1 | 6/2007 | Kapur et al. |
| 2007/0143262 A1 | 6/2007 | Kasperski |
| 2007/0147269 A1 | 6/2007 | Ettle et al. |
| 2007/0164782 A1 | 7/2007 | Church et al. |
| 2007/0168469 A1 | 7/2007 | Church et al. |
| 2007/0185859 A1 | 8/2007 | Flowers et al. |
| 2007/0233651 A1 | 10/2007 | Deshpande et al. |
| 2007/0255552 A1 | 11/2007 | Thiesson et al. |
| 2007/0282811 A1 | 12/2007 | Musgrove |
| 2008/0052152 A1 | 2/2008 | Yufik |
| 2008/0071740 A1 | 3/2008 | Jhala et al. |
| 2008/0104101 A1 | 5/2008 | Kirshenbaum et al. |
| 2008/0133752 A1 | 6/2008 | Liekens et al. |
| 2008/0140519 A1 | 6/2008 | Thiesson et al. |
| 2009/0055386 A1 | 2/2009 | Boss et al. |
| 2009/0063404 A1 | 3/2009 | Hacigumus et al. |

FOREIGN PATENT DOCUMENTS

WO          WO0182119 A2     11/2001

OTHER PUBLICATIONS

David M. Blei, et al. Hierarchical Bayesian Models for Applications in Information Retrieval, Bayesian Statistics 7, pp. 25-43, Oxford University Press, 2003 http://www.cs.berkeley.edu/~jordan/papers/jordan-valencia.pdf. Last accessed Nov. 14, 2007, 19 pages.

Kenneth Lolk Vester, et al. Information Retrieval in Document Spaces Using Clustering, Aug. 2005. IMM-Thesis: ISSN 1601-233X http://www2.imm.dtu.dk/pubdb/views/edoc_download.php/3972/pdf/imm3972.pdf. Last accessed Nov. 14, 2007, 266 pages.

Dhiman Barman, et al. Parsimonious Explanations of Change in Hierarchical Data. http://www.cs.ucr.edu/~dhiman/papers/poster.pdf. Last accessed Nov. 14, 2007, 3 pages.

Advanced Querying and Information Retrieval, Database System Concepts 4th Edition. http://www.cwi.nl/~mk/onderwijs/dbtech/assets/ch22.ppt. Last accessed Nov. 14, 2007, 78 pages.

Search Report, Parsimonious multi-resolution value-item lists. Ref No: 322346.01, Nov. 13, 2007.

Bentley et al, "Multidimensional Binary Search Trees Used for Associative Searching", Magazine—Communications of the ACM, 18:9, Sep. 1975, pp. 509-517.

Church, et al., "The Wild Thing!", Proceedings of the ACL Interactive Poster and Demonstration Sessions, Jun. 2005, pp. 93-96.

Ding et al., "Computing Geographical Scopes of Web Resources", Proceedings of the 26th VLDB Conferece, Cario, Egypt, Sep. 2000, paper 326, pp. 1-23.

Dumais et al., "Stuff I've Seen: A system for Personal Information Retrieval and Re-use", SIGIR, Jul. and Aug. 2003, pp. 72-79.

PCT International Search Report and Written Opinion dated Sep. 28, 2007 for PCT Application Serial No. PCT/US2007/008570, 7 Pages.

Isys Search Software, "Using the Word Wheel", retirved at <<http://www.isys-search.com/support/techtips/wprdwheel.html>> on Jun. 23, 2005, 1 pgs.

Jelinek, "Statistical Methods for Speech Recognition", Book, 1997, Chapt 4, Basic Language Modeling, Massachusetts Institute of Technology, pp. 60-67.

McIlroy, "Development of a Spelling List", IEEE Trans. on Communications, vol. 30, Issue 1, Jan. 1982, 13 pgs.

Mohri et al, "Weighted Finite-State Transducers in Speech Recognition", Computer Speech and Language, 16(1), Jan. 2002, 27 pgs.

MSN Desktop Search (beta), Review by PC Magazine, retrieved from http://www.pcmag.com/article2/0,1759,1771841, OO.asp, last accessed Jun. 23, 2005, 2 pgs.

Sanders, "Microsoft Play Mobile Search 'Wild Card'", retrived at <<http://www.themauritius.com/redirect/index.php?url=http://www.pcw.co.uk/vnunet/news/2155193/microsoft-plays-wildcard>>, May 3, 2006, 3 pgs.

Wang et al., "Detecting Dominant Locations from Search Queries", SIGIR '05, Aug. 2005, Salvador, Brazil, 8 pgs.

Witten et al., "Managing Gigabytes: Compressing and Indexing Documents and Images", Book by Morgan Kaufmann Publishing, San Francisco, 1999, Chapt. 3, 65 pages, (102-166).

Witten et al., "Managing Gigabytes: Compressing and Indexing Documents and Images", Book by Morgan Kaufmann Publishing, San Francisco, 1999, Chapt. 4, 55 pages, (167-221).

Witten et al., "Managing Gigabytes: Compressing and Indexing Documents and Images", Book by Morgan Kaufmann Publishing, San Francisco, 1999, Chapt 5, 48 pages, (222-270).

Witten et al., "Managing Gigabytes: Compressing and Indexing Documents and Images", Book by Morgan Kaufmann Publishing, San Francisco, 1999, Chapt 6, 58 pages, (271-328).

Witten et al., "Managing Gigabytes: Compressing and Indexing Documents and Images", Book by Morgan Kaufmann Publishing, San Francisco, 1999, Chapt 7, 60 pages, (329-388).

Witten et al., "Managing Gigabytes: Compressing and Indexing Documents and Images", Bookby Morgan Kaufmann Publishing, San Francisco, 1999, Chapt 2, 65 pages, (37-101).

Witten et al., "Managing Gigabytes: Compressing and Indexing Documents and Images", Book by Morgan Kaufmann Publishing, San Francisco, 1999, Chapt 9, 65 pages, (389-452).

Witten et al., "Managing Gigabytes: Compressing and Indexing Documents and Images", Book by Morgan Kaufmann Publishing, San Francisco, 1999, Appendix A, 67 pages, (453-back cover).

Witten et al., "Managing Gigabytes: Compressing and Indexing Documents and Images", Book by Morgan Kaufmann Publishing, San Francisco, 1999, Chapt 1, 65 pages, (front cover-36).

Zhou et al., "A New Wildcard Search Method for Digital Dictonary Based on Mobile Platform", Proceedings of the 16th International Conference on Artificial Reality and Telexistence, Dec. 2006, 5 pgs.

* cited by examiner

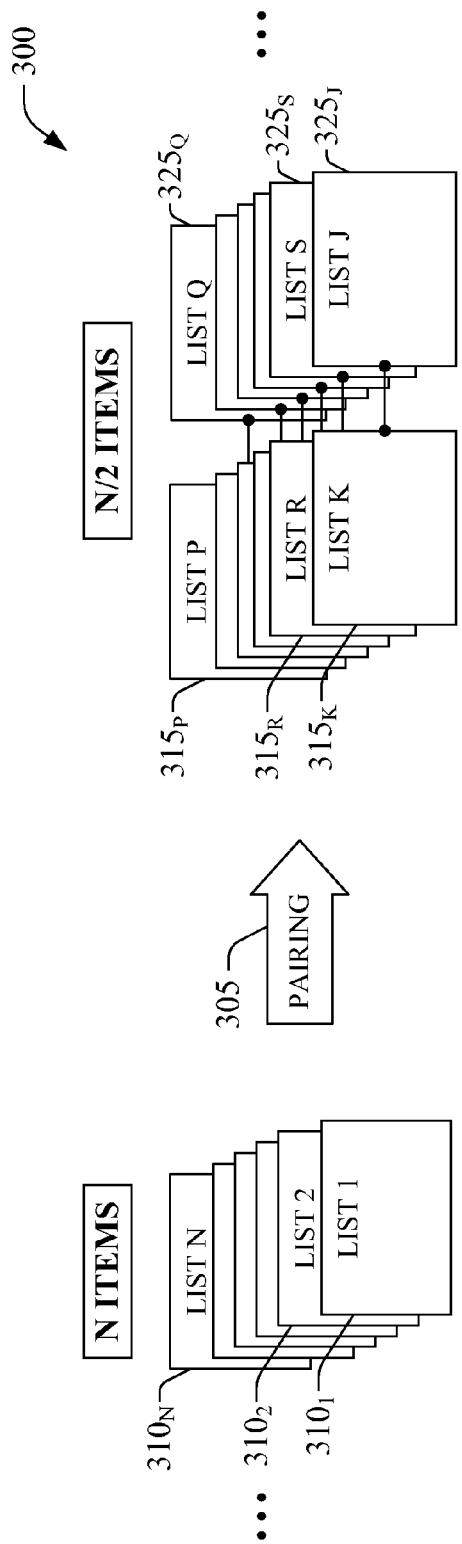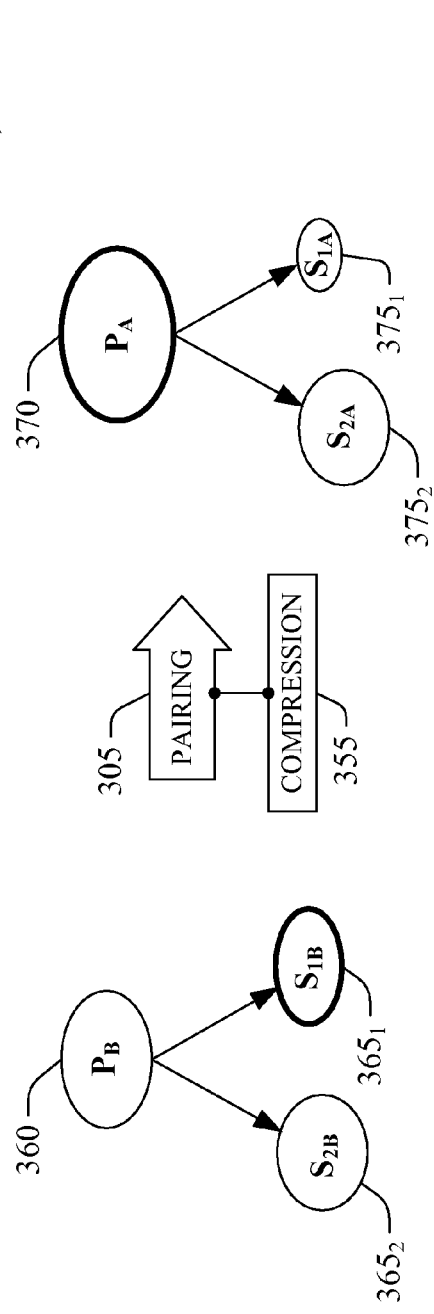
FIG. 3A
FIG. 3B

PARSIMONIOUS MULTI-RESOLUTION VALUE-ITEM LISTS

CROSS-REFERENCE TO RELATED APPLICATIONS

This application is related to co-pending U.S. patent application Ser. No. 11/333,486, filed on Jan. 17, 2006 entitled "SERVER SIDE SEARCH WITH MULTI-WORD WORD WHEELING AND WILDCARD EXPANSION"; co-pending U.S. patent application Ser. No. 11/332,954, filed Jan. 17, 2006 entitled "MULTI-WORD WORD WHEELING"; and co-pending U.S. patent application Ser. No. 11/565,231, filed Nov. 30, 2006 entitled "DEMOGRAPHIC BASED CLASSIFICATION FOR LOCAL WORD WHEELING/WEB SEARCH"; the entireties of these applications are hereby incorporated by reference.

TECHNICAL FIELD

The subject specification relates generally to representation(s) of multi-resolution value-item lists and, more particularly, to exploiting semantics encoded in target variables and a notion of nearness among nodes in a hierarchical data structure.

BACKGROUND

Technological advances in computer hardware, software and networking have provided efficient, cost effective computing systems that can communicate with each other from practically anywhere in the world. Such systems are employed to access, browse and search the Internet; compose, send and receive e-mail messages; view and edit documents; transmit and obtain text messages, instant messages, and the like.

Typically, such action can generate massive volumes of data associated with each of the applications employed in information dissemination and authoring; peer-to-peer communication or blogging; and information consumption through web-based instruments such as dedicated search engines, or catalog/product/reservation data warehouses. In addition to generation of data, the data is generally employed dynamically in various automated actions which provide interaction with the user without user intervention. Among such automated features, the following can be found: (i) targeted online advertisement, (ii) alternative product(s) or document(s) recommendation(s), (iii) log records associated with similar online action(s) taken by the user or other users, which can include query completion, or word wheeling, (iv) dynamic generation of web content originated from user queries, and so on.

Generally, the foregoing is supported by automated systems that rely on hierarchical structures of data for decision making, content retrieval, script generation, documentation, and so forth. As the volume of data employed to generate such automated features grow, it becomes necessary to efficiently manage the wealth of information that such automated features rely upon without compromising actual performance (e.g., an optimized engine to generate dynamic content and automate advertisement decisions) as well as perceived performance (e.g., in a sense of quality of service as perceived by a user of an automated feature) of producing such features.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides systems and methods for parsimonious representation of large sets of multi-resolution value-item lists. Typically, a hierarchical data structure associated with the lists and conditioning variables is learnt, or inferred, through an intelligent component while exploiting both semantics encoded (e.g., latent) in a set of value-item lists, and a notion of similarity or "nearness" among lists at a same or disparate level of description within the hierarchical data structure. Such a level of description can be dictated by a depth in a tree data structure, in which value-item lists can display disparate semantic properties depending on their position within the hierarchic data structure. A set of value-item lists as well as a set of values for conditioning variables are received through a data generation component which can be associated to substantially any computer-implemented network or service platform. Typically, variables considered in the subject innovation are queries which can be associated with specific geographic locations.

A compression scheme that evaluates potential gains in compression by promoting value-item lists from child nodes to parent nodes, and relies on a similarity metric associated with recursive greedy pairing (e.g., either pseudo-greedy, and based on binomial selection, or a stochastic extension thereof) of value-item lists in order to promote elements populating a specific tree node upwards in the tree, facilitates a parsimonious representation of the compressed hierarchic structure. Some embodiments include performing a feature reduction for a set of measure attributes or target variables, in some cases prior to conducting a pairing of a set of lists (e.g. value-item lists). In some embodiments, recursively rearranging a set of value-item lists includes pairing lists based at least in part on a stochastic greedy matching.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

BRIEF DESCRIPTION OF THE DRAWINGS

FIGS. 3A and 3B illustrate pairing of value-item lists in accordance with aspects set forth herein.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Moreover, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As discussed in detail below, the subject specification describes systems and methods for parsimonious representation of large sets of multi-resolution value-item lists. Typically, a hierarchical data structure associated with the lists and conditioning variables is learnt, or inferred, while exploiting both semantics encoded in the sets of lists and a notion of similarity or nearness among nodes at a same or disparate level of description within the hierarchical data structure. Such a level of description can be dictated by a depth in a tree data structure. A compression scheme that relies on (i) a similarity metric and (ii) recursive greedy pairing of value-item lists in order to promote elements populating a specific tree node upwards in the tree facilitates a parsimonious representation of the compressed hierarchic structure.

Figure 1:
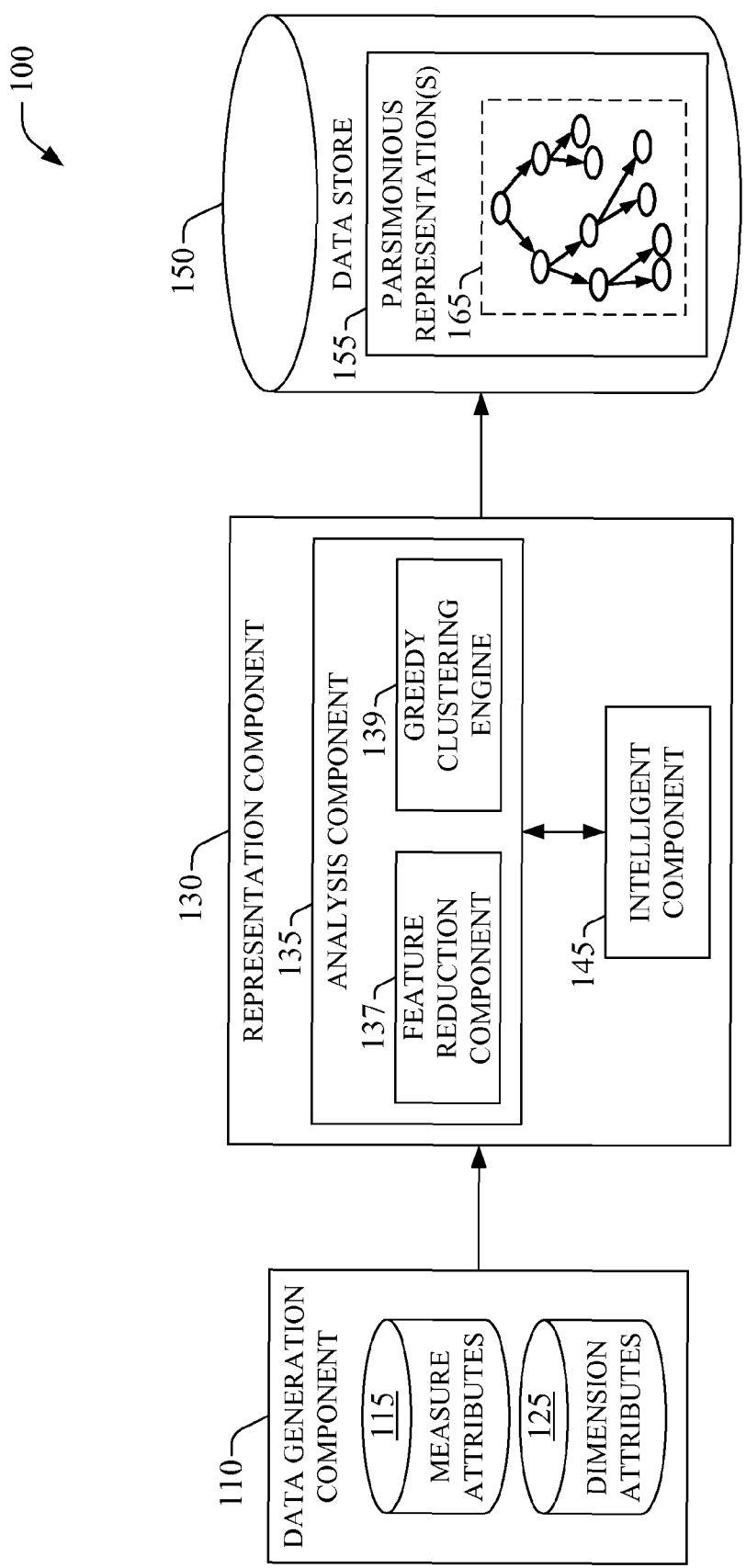
FIG. 1 illustrates a block diagram of an example system that facilitates a parsimonious representation of hierarchical data according to aspects set forth herein.

FIG. 1 illustrates a block diagram of an example system 100 that facilitates a parsimonious representation of hierarchical data according to aspects set forth herein. System 100 comprises a data generation component 110 which can convey at least two categories of data: measure attributes 115 and dimension attributes 125. Measure attributes 115, or target variables, are variables conditioned by dimension attributes 125, or hierarchical conditioning variables. As an example, measure attributes 115 can comprise substantially all different queries ever conveyed to a web-based search engine. In such scenario, it can be possible to establish an occurrence, or realization, frequency for such queries along multiple dimensions which can be dictated by a set of hierarchical conditioning variables. Conventionally, for example, query realization frequency can be established for each value of a hierarchical location variables, wherein such location variables can afford various query frequency distributions along conditional directions dictated by each of the hierarchical dimension of the variables; namely, in each of the four dimensions in the hierarchy defined through the location variable with dimensions World→Continent→Country→State→City, it is possible to determine a value-item (e.g., frequency-query) list for each of a City, a State, a Country, a Continent, and for the World. It is to be noted that other hierarchies can be introduced, such as a catalog-based hierarchy: Computer→Processor→Memory→Operative System→Application, wherein a set of value-item lists can be realized based at least in part on queries related to specific computers in a catalog, as well as specific processor, memory, operative system, and application.

It should be appreciated that the hierarchical aspect of conditioning variables, or dimension attributes 125, can imply that values of associated target variables, or measure attributes 115, can be distributed across different level of detail in a hierarchy established by the conditioning variables. In an aspect of the subject innovation, at least one hierarchical conditioning variable (e.g., dimension attributes 125) and multiple target variables (e.g., measure attributes 115) are contemplated. Furthermore, in the subject specification a massive list, or vector, of target variables is assumed; yet, it should be appreciated that the advantages put forward in the subject specification need not hinder on the size of a set of measure attributes 115. Further yet, in the subject innovation, the stream of values for measure attributes 115 and dimension attributes 125 are a priori considered as disjointed; accordingly, rather than adopting a particular hierarchy for dimension attributes 125 and then incorporating data from the measure attribute stream 115, both attribute streams are received and accumulated before inferring an underlying hierarchy from knowledge derived or gleaned from the measure attributes data stream 115, as discussed below. It is to be noted that by inferring a hierarchy, dimension attributes that apparently fail to naturally lend themselves to a hierarchical structure of values can seamlessly be incorporated as conditioning variables. In another aspect, when data generation component embodies a search engine, the disjoint approach to attribute collection can be termed "bag-of-queries," wherein a collection of queries (e.g., a set of values for measure attributes 115) are collected and immediately distributed to the substantially most specific dimensions for the conditioning attributes.

In system 100, representation component 130 receives a set of values for measure attributes 115 and dimension attributes 125 for analysis in order to generate a rich, and correlation-sensitive, hierarchical representation of the set of values for measure attributes 115 in terms of an inferred hierarchical structure for the set of values for the dimension attributes 125. An analysis component 135 can provide a feature reduction component 137 and a greedy clustering engine 139. Such components are coupled to an intelligent component 145 and facilitate determination, or generation, of a compact multi-resolution parsimonious representation of available data through analysis of received data for the measure and dimension attributes. System 130, through intelligent component 145, can infer an underlying hierarchy associated with received data for a set of received dimension attributes 115.

As used herein, the term "inference" refers generally to the process of reasoning about or inferring states of the system, environment, and/or user from a set of observations as captured via events or data. Inference can be employed to identify a specific context (e.g., a hierarchy associated with a received dimension attributes stream 125) or action (e.g., conduct a specific analysis such as perform Poisson decomposition or pursue a greedy clustering). Additionally, inference can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. It is noted that intelligent component 145 can be trained with specific subsets of known hierarchies (e.g., supervised training) and inferences can be probed through a test subset of dimension attributes.

Furthermore, it should be appreciated that intelligent component 145 can infer an underlying hierarchy through utilization of an automatic classifier (sub)system (not shown) and process (not shown). A classifier is a function that maps an input attribute vector, $x=(x1, x2, x3, x4, xn)$, to a confidence that the input belongs to a class, that is, $f(x)=confidence$ (class). Such classification can employ a probabilistic or statistical-based analysis (e.g., factoring into the analysis utilities and costs, or including measured or simulated noise in a received set of training or prediction data) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In an aspect, the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including, but not limited to, (1) determining according to a predetermined criteria when to update or refine a previously determined tree data structure according to available dimension attributes data 125, or a previously inferred schema; (2) tightening criteria on an inferring algorithm based upon a kind of data being processed (e.g., location information versus financial information, or personal versus non-personal attributes, . . . )

Upon inferring an underlying hierarchy associated with data streams (e.g., data sets) originating from measure attributes 115 and dimension attributes 125, as well as conducting an analysis of the received data, representation component 130 can store related results in data store 155, wherein a parsimonious representation(s) 155 of the received attributes values (e.g., a set of values for measure attributes 115, provided a set of values for dimension attributes 125) can be stored as compact multi-resolution tree(s) 165.

Figure 2:
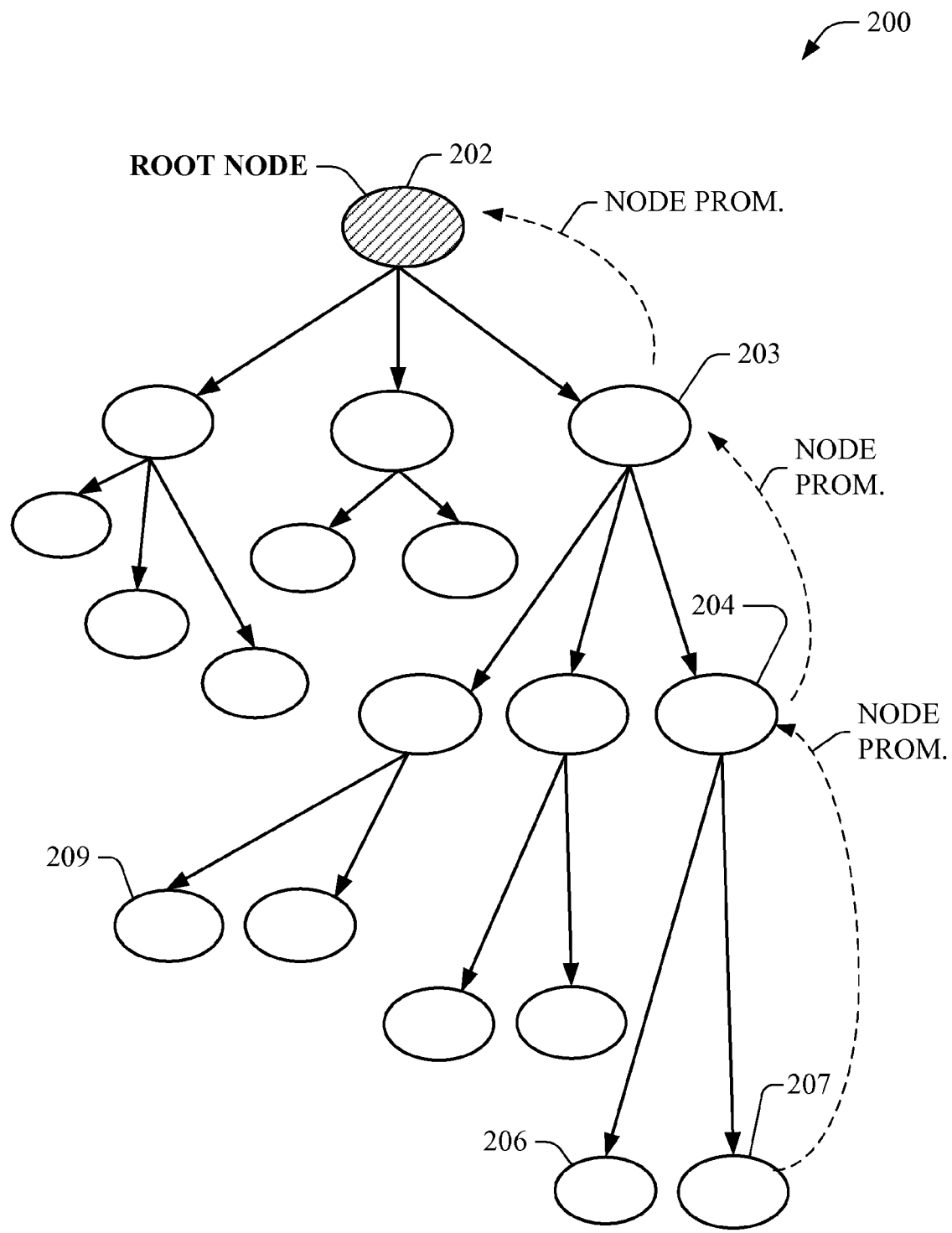
FIG. 2 illustrates a tree structure that is compressed through node reorganization in accordance with an aspect of the subject innovation.

FIG. 2 illustrates an M-ary (M a positive integer) tree structure 200 that includes a root node 202, internal nodes 203, 204, and leaf nodes 206 and 207, in accordance with an aspect of the subject innovation. The category index M in an M-ary tree typically indicates the highest number of leaf nodes per internal node that can present in a tree. A node or leaf typically represents a set of values for a list of target variables constrained to the value of conditioning variables at a particular dimension (or specificity) identified by the node or leaf. For example, a node or leaf can represent the set of frequencies of substantially all queries issued from a region that is identifiable by longitude(s) and latitude(s) that define the region (e.g., in form of a rectangle). The tree structure 200 can subsequently be smoothed via moving queries from child nodes to parent nodes in the tree structure 200 (e.g., from 207 to 204, then from 204 to 203, and from 203 to 202) based at least in part on a significance criteria, wherein the most general queries, or elements, move to the top of the tree 200 (e.g., queries of interest to a substantially large number of users; such as a continent or a country, and the like), while queries of interest to a substantially smaller number of users (e.g., a city, neighborhoods in a city, and the like) remain at lower portions of the tree.

The tree structure 200 can adopt the form of a tree with an enhanced compression in accordance with a similarity criterion, as described in detail infra.

According to an aspect of the subject innovation, a list of elements can be provided, wherein each element can contain: frequency, query, latitude, longitude, and other demographics. In this situation the tree is a location based tree and can generally be an M-ary tree that partitions the World (or a predetermined area to be covered) into tiles. It is to be noted that while various aspects of the subject innovation are illustrated with binary (M=2) trees, substantially any M-ary tree can be utilized in conjunction with the innovation herein described and thus M-ary trees are within the scope of the subject innovation. As a partitioning illustration, the subject innovation can alternate between splitting on latitude and longitude at different levels in the tree. A split can be created so that the sum of frequencies for the elements remains the same on both sides of the split. Accordingly, the elements can be partitioned into the leaves in the tree, according to the elements latitude and longitude to obtain a balanced Kd-tree.

In another aspect, construction of a tree proceeds according to a bottom-up approach, wherein only leaf nodes have value-item lists associated in the form of frequencies for queries in locations conveyed by latitude and longitude. For example, leaf 206 can correspond to the Seattle area, in which case leaf 206 then contains all queries and their associated frequencies relevant to such a location. The utilized bottom-up approach can then be enhanced by creating an adjusted location tree, wherein distributed elements on the leaves are "thinned out," by (recursively) promoting elements that are similar upwards in the location tree. When the frequencies for the same query in two sibling nodes (e.g., 206, 207) are similar—but not necessarily equal—these two elements are both promoted to their parent in the location tree. Promotion is in this case accomplished by deleting the elements in the siblings (in effect, an action analogous to setting frequencies to zero) and then instead inserting the element in the parent; yet, with a frequency equal to the sum of the actual frequencies in the siblings. Otherwise, when the frequencies are not similar, a sibling can be promoted with the smallest frequency by inserting the element in the parent with a frequency equal to two times the smallest of the frequencies and then subtracting this frequency from both siblings (leaving the smallest frequency sibling with a zero value—and in effect deleting the element from this sibling).

It is to be appreciated that substantially any test for similarity of frequencies can be employed when deciding on the promotion of siblings—and such choice can in part depend on the application. In an aspect, a "sign test" can be implemented, which returns the (one-sided) level of significance assigned to the alternative hypothesis that the smaller frequency is smaller than the higher frequency under the H0 hypothesis that they are equally likely, for example. As an example, such H0 hypothesis can state a Binomial distribution with p=0.5, and the significance level equals the (one-sided) Binomial tail, which can be computed for smaller frequencies (lesser or equal than 50). For higher frequencies, the binominal distribution can be efficiently approximated by a Normal distribution. Accordingly, the significance level can decide the degree of promotion of elements from more local nodes (e.g., 206, 207) toward more global nodes (e.g., 204); e.g., from leave nodes towards the root node). It is to be noted that for a smaller significance level it is harder to violate the H0 hypothesis that two frequencies are similar, and elements are in this case more likely to move upwards in the location tree. Generally, a single significance level can be employed for typically all tests in a location tree. The significance level α can be adjusted, for example, in a Bonferroni-like manner:

$$\alpha(D) = 1 - 0.95^{2^{\frac{1}{(D-1)}}},$$

where D indicates a depth in a tree. As an illustration, such depth dependence yields the following significance levels: $\alpha(1)=0.05$; $\alpha(2)=0.0253$; and $\alpha(15)=3.13 \times 10^{-6}$.

FIGS. 3A and 3B illustrate example pairing of value-item lists that can be employed to manipulate a tree (e.g., binary tree), or hierarchic, data structure to obtain a new tree structure that better reflects the semantic latent structure (e.g., the intrinsic correlations that lead to a specific hierarchy) that is inherently present in the data (e.g., dimension attributes 125). As illustrated in diagram 300, value-item lists can be clustered into pairs (315) by greedily pairing lists (e.g., location-based queries) that are the most similar. For example, similarity between two lists elements (e.g., lists $310_1$ and $310_N$) can be denoted as the number of non-zero entries that are the same according to the binomial criterion described above. Once a set of N list elements (e.g., $310_1$-$310_N$) have been grouped into N/2 pairs (e.g., $315_K$-paired-to-$325_J$, $315_R$-paired-to-$325_S$, and so on), query counts for each pair can be promoted one level up in the tree for each pair, as indicated above. Thus, further clustering can continue recursively, wherein clustering the resulting set of super-lists (or super-locations) into N/4 pairs, and so forth, until the root node of the resulting tree is reached.

It should be appreciated that the greedy point-matching (e.g., pairing 305) that can be performed on each level of an initially inferred (e.g., by intelligent component 145) tree can be deemed as an approximation to an optimal pairing in that the above discussed matching can fail to provide a set of pairs whose distance (e.g., Euclidean distance in query space, or cosine similarity metric) is minimal. Accordingly, a randomized greedy matching, or pairing can be employed to increase the likelihood to reduce distance in element (e.g., query) domain. The rationale behind greedy matching, or pairing (e.g., 305) can be illustrated by indicating that a pair of value-item lists (e.g., $310_2$ and $310_N$) originated in similar locations can be more likely to be beneficial to the reduction of total distance (in query space, for example) than a pair of lists that originate in disparate locations. In an aspect, intelligent component 145 can infer based at least in part on historic data and cost-benefit analysis whether a current greedy matching strategy can deliver distances within a predetermined tolerance.

To access a larger number of candidate pairings than that provided by a single greedy matching solution, it is possible to proceed in the following manner: Instead of sorting the similarities and then selection a query-specific (e.g., location) pairs starting with the best one, then the second best, etc., one can define a probability distribution $$p(i, j) = \frac{\exp(-\beta d_{ij})}{\sum_{i,j} \exp(-\beta d_{ij})}$$

over point-pairs (i,j), where $d_{ij}$ is a distance among points in pair (i,j), and β is a constant that controls a shape of the probability distribution. Pairs (i,j) with small distances can be more likely under such a distribution than those with large distances. Thus, by sampling pairs (i,j) from p(i,j), the obtained can be pairings that, similarly to the greedy matching solution above, tend to reduce a total distance substantially in view of the constructed stochastic distribution p(i,j) of pairs. It is to be noted that candidate matching can be generated by repeating the sampling procedure a specific number of instances (for example, the number of instances can be determined by intelligent component 145 based at least in part or available computation resources for sampling) and then retain a matching with the best total similarity.

FIG. 3B illustrates a parent-sibling fragment of a binary tree structure before and after a pairing and content rearrangement has taken place. A list-similarity measure that can be employed to compute the amount of compression that can be attained via a promotion of substantially all matching value-item elements in the siblings (or lists) are considered as the source of the promoted content. Compression can be defined as follows. Let $S1_B$ $365_1$, $S2_B$ $365_2$, and $P_B$ 360 denote the number of (non-zero) elements in value-item lists residing, respectively, at two siblings and the parent before a promotion for the pair of lists; and let $S_{1A}$ $375_1$, $S_{2A}$ $375_2$, and $P_A$ 370 denote equivalent nomenclature for non-zero element numbers after a promotion; the compression κ is therefore given by (recalling that $P_B$=0) $\kappa = S_{1B} + S_{2B} - (S_{1A} + S_{2A} + P_A)$. By recalling the definition for promotion, it is possible to verify that the compression count can only improve/increase when a same item in the two lists has similar values according to the chosen similarity measure for elements (for example, the aforementioned "sign test"). Compression 355 is therefore also a proxy for semantic equivalence between the lists. (It should be appreciated that a small value may be deemed similar to zero by the element-similarity metric, in such a case compression is not attained for that element.)

When conditioning variables lend themselves to the notion of nearness (for instance the aforementioned latitude/longitude variables), an alternative aspect can include nearness into account by constraining the above paring of lists to be within a certain neighborhood of each other. To the accomplishment of the foregoing, in an aspect, an initial Kd-tree can be constructed utilizing received data streams of values for measure attributes 115 and dimension attributes 125, and then constrain the pairing of lists within a set of lists to only allow a first list and second list to be paired when the first and second lists descend from a common predecessor at a certain height (or depth) in the tree. It should be appreciated that alternative manners of defining nearness are possible, even though computation demand may be an issue when implementing any of such alternatives. As an example, an alternative metric for nearness can be to measure it according to centers of received conditioning variables (e.g., dimension attributes 125) without exploiting a Kd-tree to narrow a number of pairings that is to be considered.

In one aspect of the subject invention, the number of features in a set of value-item lists is typically reduced prior to conducting a similarity analysis among value-item lists during each step in the hierarchic construction of a parsimonious tree representation. As an example, to uncover latent semantic structure(s) that underlies a value-item (e.g., query-count) list that can be observed at various geographic locations, a low-dimensional representation of a list can be constructed employing a method akin to singular value decomposition (SVD). It is noted that the term "low-dimensional representation" refers to an analysis typically conducted after spectral truncation of singular values, wherein singular values of small magnitude are neglected.

Conventionally, SVD is commonly utilized to extract features that typically reflect underlying correlation among a set of high-dimensional data. A data-matrix Y, containing n d-dimensional data-points columnwise (with mean zero), can be decomposed into the product $Y=UDV^T$, where $V^T$ indicates the transpose matrix of V. In addition, setting a few singular values (generally the first few smallest values) residing on the diagonal of matrix D to zero provides a low-rank approximation (e.g., a low-dimensional approximation) that captures a substantive portion of the underlying variability in the data.

One conventional variation of SVD amounts to computing the decomposition Y=RC. Such a variation of SVD is generally applicable when dealing with a single fixed dataset, where it is not necessary to generalize low-dimensional representations to test-data that has not been observed during a training step, for example. In practice, this variation of SVD can be computed by minimizing the squared reconstruction error $\|Y-RC\|^2$ with respect to the matrices R and C. Since this minimization can be achieved in online-fashion by visiting one entry of the data-matrix Y at a time, it is particularly well-suited for dealing with substantially large amounts of data, as well as data-matrices with missing entries. (For data that is not zero-mean, it is possible to alternatively minimize $\|Y-RC-B\|^2$ with respect to R, C and the matrix B of so-called biases. Matrix B is typically constrained to be the same within each row. In such a case it can alternatively be represented as a vector b.)

It should be appreciated that conventional SVD can be related to principal components analysis (PCA) by assuming that the data Y is distributed according to a Gaussian distribution. PCA can also model data distributions from the exponential family other than Gaussian. It should be appreciated that for modeling count data, it can be useful to assume a Poisson distribution instead of a Gaussian distribution.

In one aspect of the subject innovation, the simplified decomposition Y=RC is extended in order to account for count-data also. To this end, entries in the data-matrix Y are assumed to be Poisson-distributed; namely, ya i, the i-th component of data-case c, (equivalently, the entry (i, c) in matrix Y) is assumed to be drawn from a Poisson distributed random variable whose log-mean is given by a linear function of latent features:

$$\log \lambda_i^\alpha = (R_{i,.})^T C_{.,\alpha} + b_i. \tag{1}$$

In Eq. (1), $R_{i,.}$ and $C_{.,\alpha}$ denote, respectively, the $i^{th}$ row of matrix R and $\alpha^{th}$ column of matrix C. Furthermore, the scalar quantity $b_i$ is used to represent the row-mean. Since the mean $\lambda_i^\alpha$ of the Poisson distribution needs to be positive it is represented by its logarithm. The distribution for the data can now be written according to $$p(y_i^\alpha) = \frac{\exp(-\lambda_i^\alpha)(\lambda_i^\alpha)^{y_i^\alpha}}{y_i^\alpha!}. \tag{2}$$

It is to be noted that the subject formulation differs from conventional approaches in that in that $y_i^\alpha$ is not drawn from a Gaussian distribution whose mean is a function of latent features.

Learning underlying latent features of data is accomplished by maximizing the log-probability of the data:

$$L(R, C, b) = \sum_{\alpha,i} \log p(y_i^\alpha) \tag{3}$$

where b is defined as a vector containing all $b_i$. Such learning can be effected through feature extraction component 137 in conjunction with intelligent component 145. Utilizing the foregoing definitions, the data log-probability can be re-written as $$L(R, C, b) = \sum_{\alpha,i} -\lambda_i^\alpha + y_i^\alpha \log(\lambda_i^\alpha) - \log(y_i^\alpha!) \tag{4}$$
$$= \sum -\exp((R_{i,.})^T C_{.,\alpha} + b_i) + y_i^\alpha ((R_{i,.})^T C_{.,\alpha} + b_i) - \log(y_i^\alpha!)$$

It should be appreciated that the last term $(\log(y_i^\alpha!))$ can be removed from an optimization act. For derivatives, one obtains:

$$\frac{\partial L}{\partial R_{i,f}} = \sum_\alpha (y_i^\alpha - \lambda_i^\alpha) C_{f,\alpha}, \tag{5}$$

$$\frac{\partial L}{\partial C_{f,i}} = \sum_i (y_i^\alpha - \lambda_i^\alpha) R_{i,\alpha}, \tag{6}$$

$$\frac{\partial L}{\partial b_i} = \sum_\alpha y_i^\alpha - \lambda_i^\alpha. \tag{7}$$

It should be appreciated that row-features R are shared between all cases, and column-features C are shared across all dimensions, which leads to a parsimonious representation wherein features learn to represent latent traits, such as semantics for text data, filters for image data, or localized semantics for localized query data (e.g., query-frequency lists).

Figure 4:
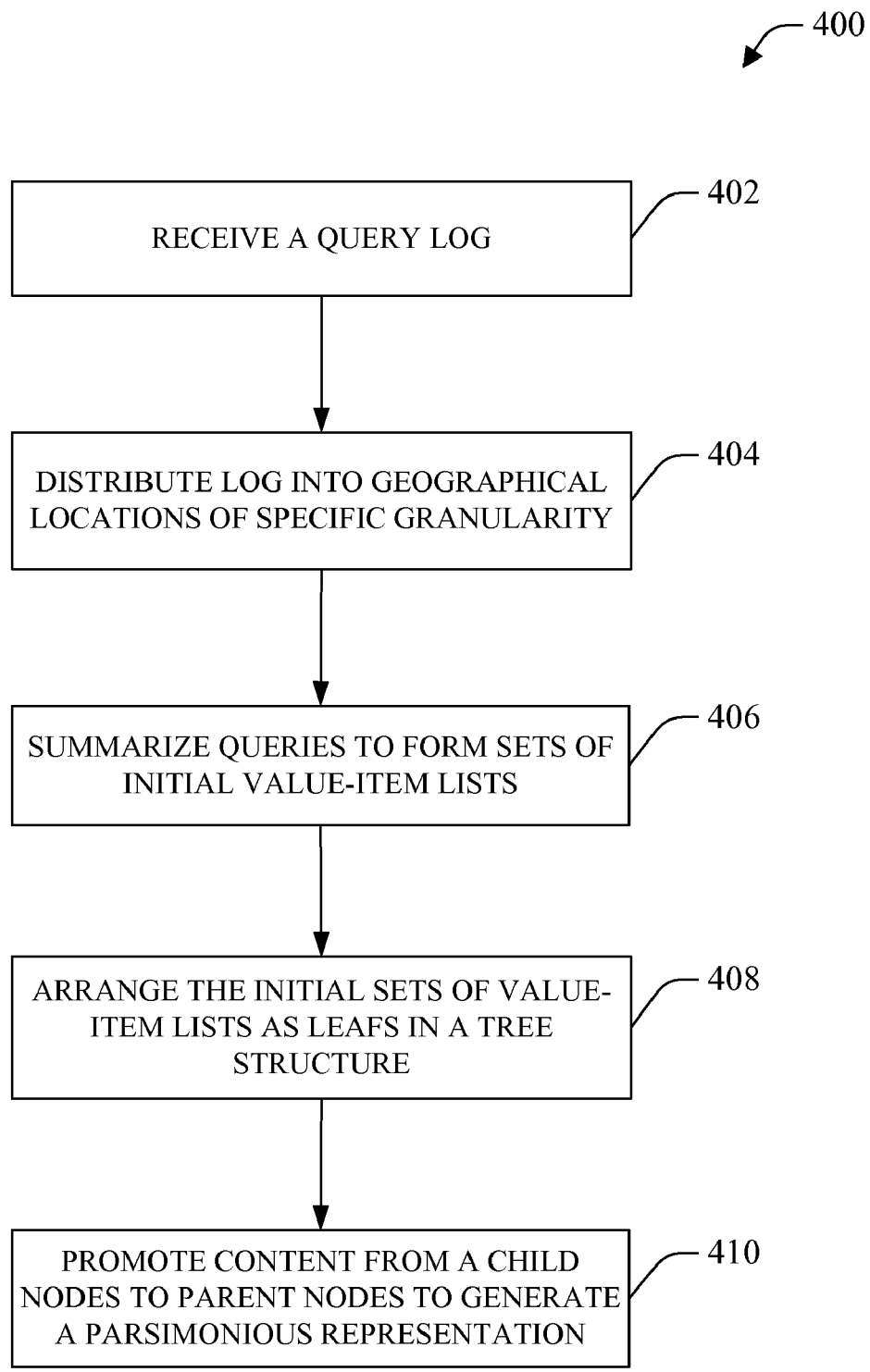
FIG. 4 presents a flowchart of an example method for generating a parsimonious representation of a tree data structure in accordance with an aspect of the subject innovation.

FIG. 4 illustrates an example method 400 for generating a parsimonious representation of tree data structure in accordance with an aspect of the subject innovation. Value-items lists are illustrated with queries and associated geographic information; however, example method 400 can be utilized to generate a parsimonious representation of tree structured data comprising substantially any type of value-item lists. In addition, while example method 400 is illustrated and described herein as a series of blocks representative of various events or acts, the subject and other methods set forth in the subject innovation are not limited by the illustrated ordering of such blocks. For instance, some acts or events may occur in different orders and/or concurrently with other acts or events, apart from the ordering illustrated herein, in accordance with the subject innovation. In addition, not all illustrated blocks, events or acts, may be required to implement a methodology in accordance with the subject innovation. Moreover, it will be appreciated that the subject example method and other methods accordance with aspects of the subject innovation can be implemented in association with the method illustrated and described herein, as well as in association with other systems and apparatus not illustrated or described.

In particular, in example method 400, at act 402 a set of queries are collected from a query log. At act 404, information associated with geographic location(s) in which queries in the query log were issued is utilized to distribute the queries among buckets, or data containers, characterized by a specific granularity of geographic information of interest. It is to be appreciated that distribution of queries based on a geographic location represents an example criteria, and other demographic criteria can also be employed for such distribution among data containers and tree formation. In addition, it should be further appreciated that the query log can comprise queries associated with substantially any type of networked service, such as a web-based search engine or online catalog, a customized database accessible through a local area network, a vehicular navigation system, a commercial or industrial barcode and radio-frequency identification tag information server, and so on. At 406, the set of queries are summarized to form initial sets of value-item lists (e.g., queries and associated frequencies). At 408, the initial sets of value-item lists are arranged as the leafs in the tree structure. It should be appreciated that geographic locations do lend themselves to a hierarchic structure, which can be represented through a tree structure. In principle, however, connections of children nodes to parent nodes in the tree can be random for an initial construction of the tree. At 410, the initial sets of value-items lists are compressed by (a) rearranging the nodes in the tree structure in order to improve the semantic similarities of a set of value-item lists (e.g., queries with frequencies) of siblings in a tree, and (b) promoting content from a set of child nodes to a set of parent nodes; e.g., promoting content from nodes at lower portions of the tree to upper portions. Similarity of value-item lists and content can both be based at least in part on a significance criterion.

Figure 5:
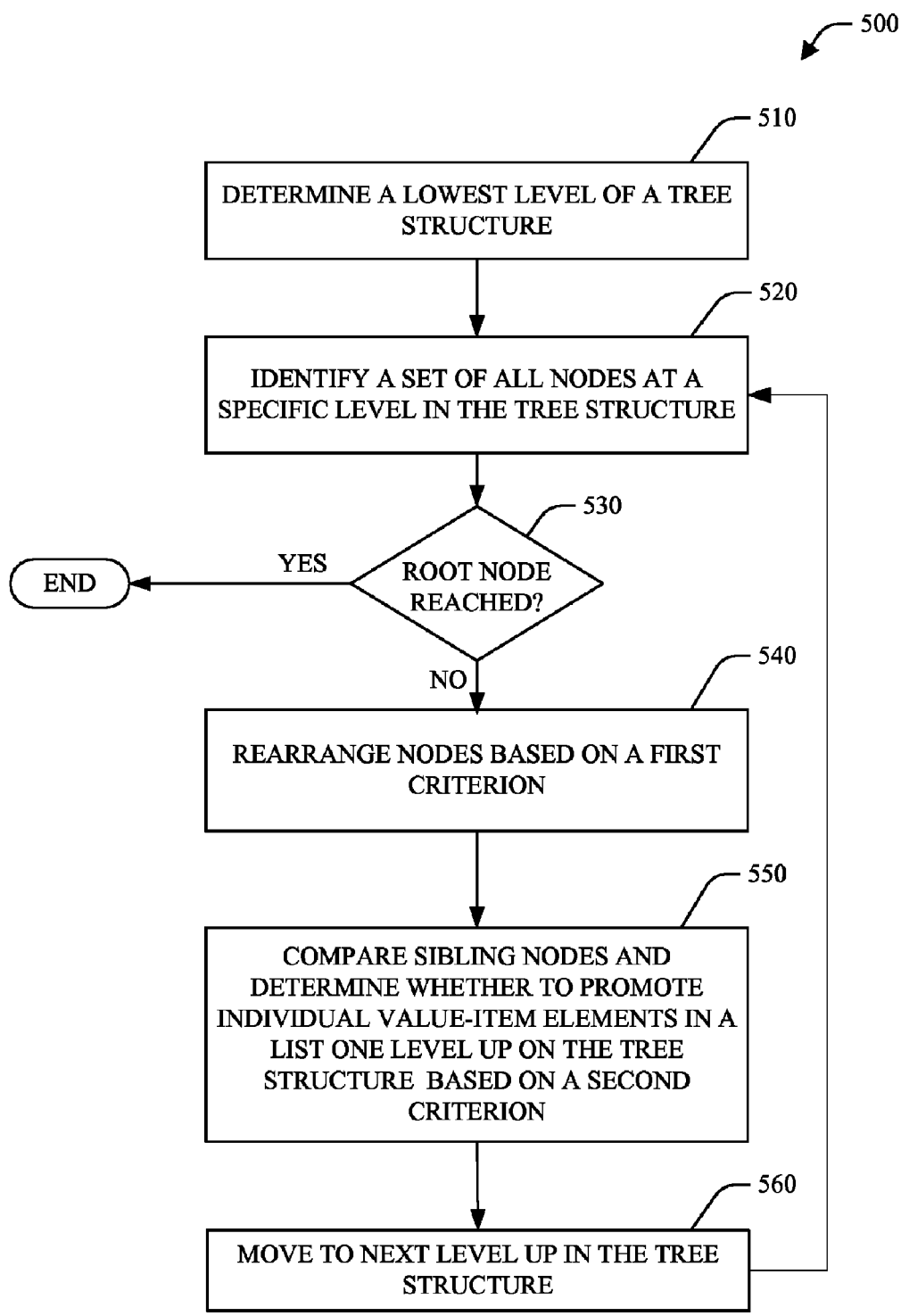
FIG. 5 presents a flowchart of an example method for generating a tree structure according to an aspect of the subject innovation.

FIG. 5 presents a flowchart of a method 500 for compressing value-item lists stored in a tree structure. In an aspect, the tree structure is a balanced binary tree, and the value-item lists are stored in the leaf nodes of the binary structure. At act 510, a lowest level, or depth, of a tree structure is determined. Such a determination typically results in initialization of a set of variables that facilitate the compression of the value-item lists. At act 520, a set comprising all nodes at a specific level D, or depth, in the tree structure is identified. At act 530, a verification is conducted as to whether the root node (D=1) in the tree structure has been reached. If root node has been reached, no further query compression takes place. Conversely, flow is directed to act 540. At act 540, nodes in the set of nodes at level D are rearranged based on a first criterion, comparing sets of value-item lists in disparate nodes. The rearrangement modifies parent-child associations in the tree structure in a manner that leads to children of a parent being substantially more similar than before arrangement. At act 550, such child nodes that share a parent node after the rearrangement are evaluated based on a second criterion, to determine whether individual elements in a list that populates the nodes can be promoted one level up in the tree structure. The first and second criteria can both be similarity metrics. Alternatively, or in addition, either one of the first and second criteria can be a measure of similarity. In another alternative, neither of the first or second criteria can be a measure of similarity. In an aspect, a similarity metric can determine an amount of compression that can be achieved by promoting value-item elements from lists in sibling leafs into a value-item list in parent node in the tree structure. At act 560, focus is moved to the next level (D=D−1) in the tree structure and flow is subsequently turned to 520.

Figure 6:
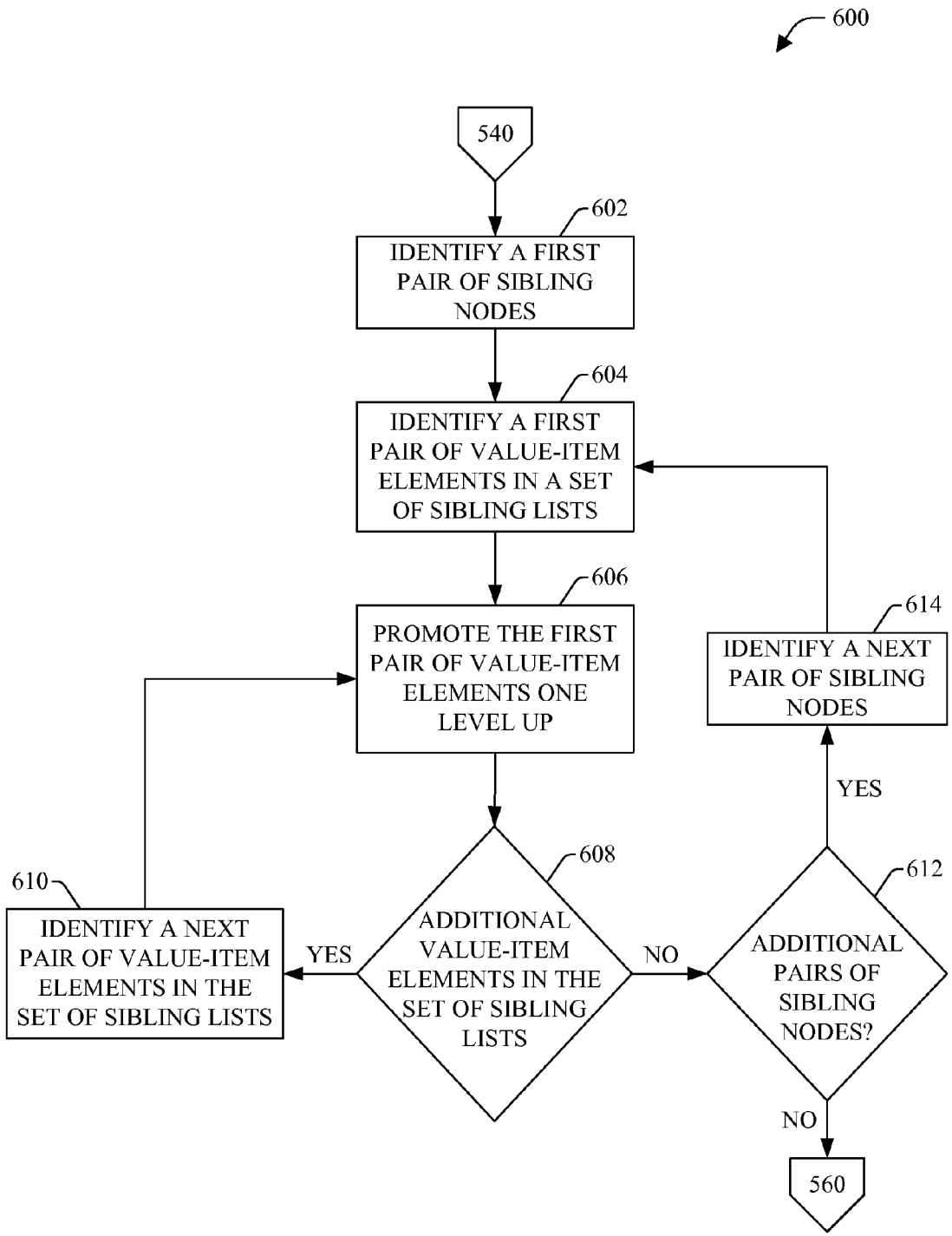
FIG. 6 presents a flowchart of an example method for promoting elements in a value-item list upwardly in a hierarchic tree structure.

FIG. 6 illustrates in detail act 504 in example method 500, to accomplish such illustration FIG. 6 presents a flowchart of an example method 600 for promoting elements in a value-item lists upwardly one level in a hierarchic binary tree structure. At act 602, a first pair of sibling nodes is identified from the rearrangement of nodes in act 503. Each node can represent a value-item list. These value-item lists represent a same set of items in that an item that fails to explicitly appear in a list but appears in another list will implicitly appear in the former list with a value of zero. At act 604, a first pair of value-item elements is identified from the set of two sibling lists. Such first pair will have the same item with likely a different value assigned. At act 606, the value-item pair is promoted. When the values for the same item in two sibling nodes are similar—but not necessarily equal—said two elements are both promoted to their parent node. Promotion is in this case accomplished by deleting the elements in the sibling nodes (an action effectively analogous to setting values to zero) and then instead inserting the element in the parent node; yet, with a value equal to the sum of the actual values in the sibling nodes. Alternatively, when the values are not similar, the item can be promoted by inserting the element in the parent node with a value equal to two times the smallest of the values and then subtracting said value from both values in the value-item elements in the sibling nodes, leaving the smallest value sibling with a zero value—and in effect deleting the element from the value-item list in this sibling node. At act 608, verification is conducted as to whether there are more value-item elements in the value-item lists for the two sibling nodes. When more elements remain, at act 610 next pair of value-item elements to be considered for promotion is identified, and flow is directed to act 606. Conversely, flow is directed to act 612, wherein it is determined whether more sibling nodes remains to be analyze at this level in the tree structure. If there are more nodes, at act 614 a next pair of sibling nodes is identified and flow is directed to act 604. Conversely, all nodes at this level of the tree structure have been analyzed, and flow is turned to 560 in example method 500.

In an aspect, in an example scenario with two child nodes, a first child node can have a target value-item list (query-frequency list) with a first query "Google" having an associated frequency of 10, a second query "Microsoft" having a frequency of 9, and a third query "Yahoo" having a frequency value of 2. In the second child node the second query "Microsoft" can have a frequency of 20, "Google" can have frequency of 10, and "Yahoo" can have a frequency of 3. Value-item elements can be promoted from the set of value-item lists in the two child nodes to a value-item list in the parent node (see FIGS. 5 and 6). Before promotion there is a total of 6 value-item elements in the two child nodes. In such a case, "Google" is represented by values of 10 and 10, thus the values are the same and these value-items can be promoted. So the query "Google" is moved to the parent node and given a value of 20, e.g., the addition of the two constituent frequencies. The query "Google" can then be deleted from the set of lists in the child nodes since in such nodes their associated frequency is set to zero. In turn, the query Microsoft has values of 9 and 20, in the two lists, it is readily apparent these values are not similar. The lowest value is therefore promoted from each child to the parent node, in which case the query "Microsoft" adopts a value of 18 in the parent node, a value of 11 in the child node with an initial value of 20. The query "Microsoft" is deleted from the child node with an original value of 9. Query "Yahoo" appears with frequencies of 2 and 3, which within a sign test can be deemed to be similar values and thus the query "Yahoo" is promoted. The promotion of value-item elements from children to parents compresses the information in the value-item lists, creating a more parsimonious representation of a tree structure. In the above example, the initial value-list lists contained 6 values, and the resulting lists presented 4 elements. Such an amount of compression is determined by a notion of similarity that compresses the values of individual elements in the set of value-item lists associated with the children nodes.

In another aspect, to compare the whole content of a set of value-item lists in disparate nodes, a disparate similarity criterion can be applied upon the illustrative frequency-query list above (a common set of three queries: "Google," "Microsoft," and "Yahoo," having, respectively, example frequencies of 10, 9, 2 in a first child node, and example frequencies of 10, 20, and 3 counts in a second node. Namely, the criterion can be based at least in part on the frequency a specific query displays a same or a nearly-same frequency realization. In the subject example comprising a set of two value-item lists with three queries each, such a similarity criterion yields a metric with value of two: "Yahoo" and "Google" are similar across nodes. As discussed above, similarity is exploited to generate a parsimonious representation of a hierarchic tree, which is constructed in a bottom-up manner, by pairing lists comprising specific value-item elements as tuples and promoting paired elements upwards in the tree. It should be appreciated that a trade-off between compression and a nearness determination—adopting frequencies of 9 and 20 counts as nearly-same or "sufficiently" near, a pairing act can be effected and compression attained; yet, such again in compression occurs at the expense of similarity features of the hierarchic tree structure. Such a trade-off, and associated determinations of "sufficiently near" conditions can be managed by an extrinsic agent (e.g., a human user or a computerized system), or an intrinsic agent like intelligent component 145. To that end, when a sign test, or substantially any similarity evaluation, is carried out, a similarity "boundary" can be introduced. While 9 and 10 are similar, but 5 and 10, are more different that 1005 and 1010, they are more different with respect to the sign test described above. However, other conditioning variables can be employed to build a hierarchical tree. Each child node contains a vector such as ("Google" 10, "Microsoft" 9, "Yahoo" 3). The list of value-items, in such a case, is a list of queries and related numbers associated with these queries. These associated numbers can be the number of searches an agent ran on that particular search engine, or a number of hits received from the particular search engine. Regardless the specific meaning of a count value, the count values the target variable. After an initial tree is created, contents in child nodes can be promoted in accordance with a similarity metric for lists such that when promotions are made, the rearranged tree facilitates further promotions.

The sign test operates on a single target variable (e.g., query), and is utilized to identify whether individual value-item elements in a pair of value-item lists are similar. The sign test can also be employed as a mean for determining the similarity among a pair of value-item lists by counting the number of times the sign test deems individual value-item elements in the pair of lists to be similar. This second notion of similarity can be regarded as the semantic similarity between nodes with value-item lists. Alternatively, or in addition, it is possible to implement a criterion (e.g., first criterion in method 500) for moving the vectors around, and a disparate criterion (e.g., second criterion in method 500) when proceeding to promote value-item elements.

It should be appreciated that construction of the parsimonious representation of a tree-structure is a bottom-up approach that relies on creation of a hierarchic tree structure in accordance with a pairing criterion. Typically, a criterion based on a semantic similarity of value-item lists can be employed for tree development (the first criterion in method 500); yet, when conditioning variables lend themselves to the notion of nearness it is possible to trade-off semantic similarity of target variables with nearness of conditioning variables during node comparisons in the construction of the tree. Nearness can, for instance, convey the distance among two geographic locations, whereas general point average (GPA) can convey nearness among two college students in academic-performance space. It is to be noted that the conditioning variable(s) are relied upon to construct the tree, and the target variable(s) are the contents utilized to generate sets of value-item lists (e.g., query-frequency) In one aspect, a set of values for conditioning variables can determine a set of locations, while target variables can characterize lists of observations associated with the set of locations conveyed by the conditioning variables. To create a parsimonious representation of a hierarchic tree based at least in part on a nearness semantics, an initial hierarchy of vectors of content gleaned from the target variables is generated, and then systematically rearranged according to a similarity criterion for value-item lists (e.g., Euclidean distance, or cosine similarity metric) that in addition trades off the semantic similarity of values for the target variables represented in the lists with nearness of values for the conditional variables giving raise to the hierarchic tree structure. Nodes can be paired either (a) optimally, which typically is computationally demanding in view of the massive sizes of sets of value-item lists; or (b) greedily, as described herein.

In another aspect, selection of the similarity criterion for comparing value-item lists and the selection of the criterion for comparing individual value-item elements can be accomplished through intelligent component 145, which can employ historic data in connection with previous rearrangements and subsequent series of promotions to infer optimal criteria, e.g., similarity metric, for a particular set of value item lists. It should be appreciated that the two criteria can impact differently the degree of compression afforded to the final tree structure representation. In another aspect, intelligent component 145 can infer when to employ pre-compiled sign test in order to reduce computing resources.

Figure 7:
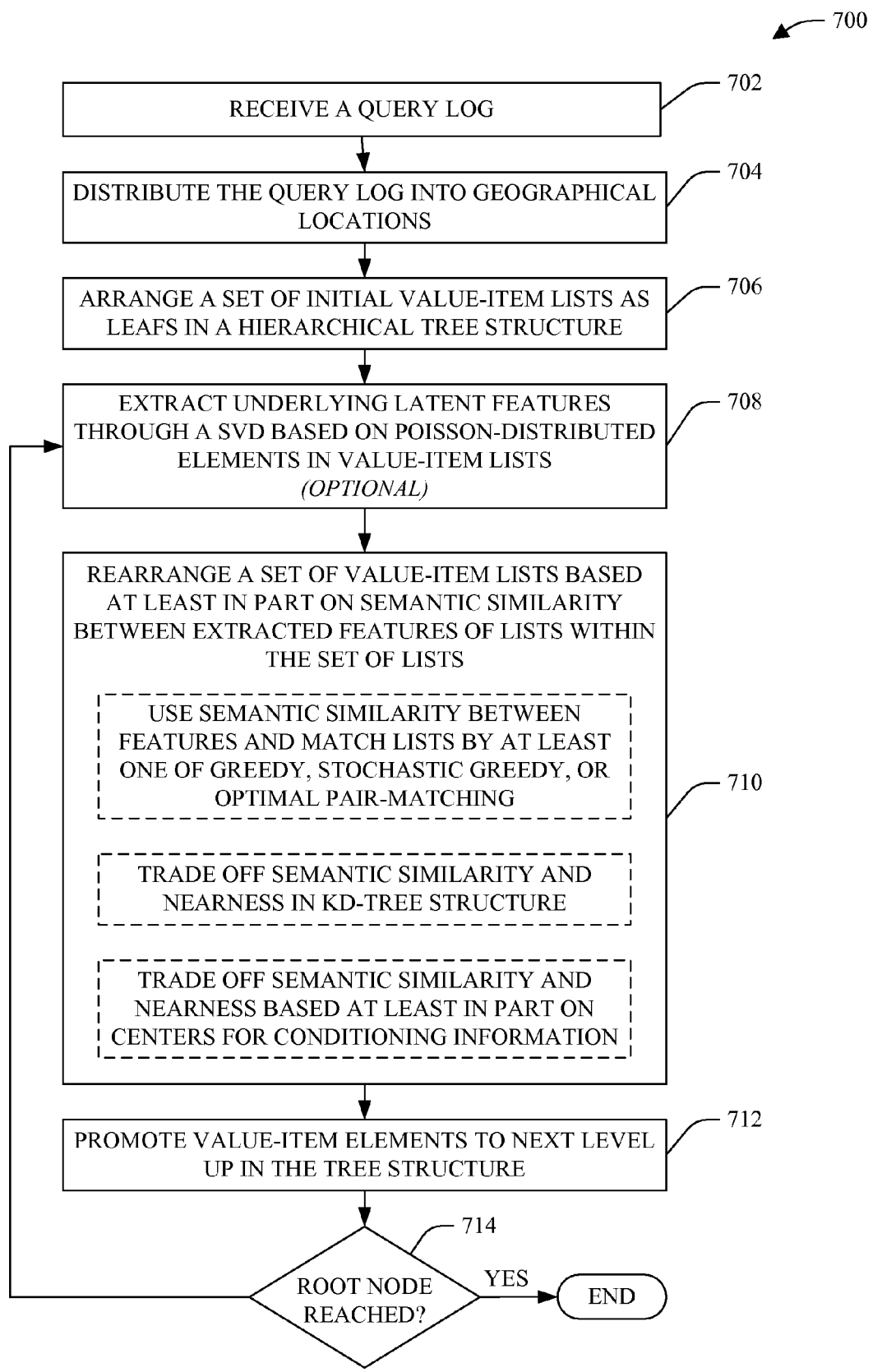
FIG. 7 presents a flowchart of a related example method for mitigating a computational demand of generating a parsimonious representation of a hierarchic data structure according to aspects described herein.

FIG. 7 presents a flowchart of a related example method 700 for mitigating a computational demand of generating a parsimonious representation of a hierarchic data structure. At act 702, a query log is received. In an aspect, the query log can be generated via a data generation component like component 110. At act 704 the queries in the query log is distributed into geographical locations according to a predetermined, specific granularity, like query's point of origin, etc. At act 706, a set of initial value-item lists is arranged as leafs in a hierarchical tree structure. Generally, such data comprises measure and dimension attributes related to the specific collected query log. At optional act 708, underlying latent features are extracted, or learned, from a set of elements in a set of value-item lists through a SVD that adopts a Poisson distribution for the set of elements. Such feature extraction can be accomplished with feature extraction component 137 in a representation component 130. At act 710, a set of elements within value-item lists in the leaf nodes in the tree structure are rearranged based at least in part on a semantic similarity criterion applied to extracted features of lists within the set of lists in order to attain a compact, parsimonious representation of the hierarchic data structure. Rearrangement of the set of value-item lists can utilize a greedy method pair-matching method for maximizing the similarity of extracted features for pairs of value-item lists (FIG. 3A); a stochastic greedy pair-matching method, which can present an increased likelihood of matching lists with a higher overall accumulated similarity for all pairings; or an optimal pair-matching method, which will obtain the pairing with highest overall accumulated similarity among pairs. Alternatively to the pair-matching based on semantic similarity for queries, the pair-matching can, in addition to semantic similarity, be based on (1) nearness with respect to a Kd-tree constructed from geographical location information; or, in addition to semantic similarity, it can be based on nearness between centers computed from geographical information for the queries represented in the set of value-item lists. At act 712, value-item elements (e.g., the individual queries with frequency counts) are promoted to the set of value-item lists associated with nodes in a next level up in the tree structure. At act 714, verification is conducted as to whether the root node in the tree structure has been reached. When the root node has been reached, example method 700 ends. Conversely, flow is directed to act 708 which acts on value-item lists one level up in the tree structure.

Figure 8:
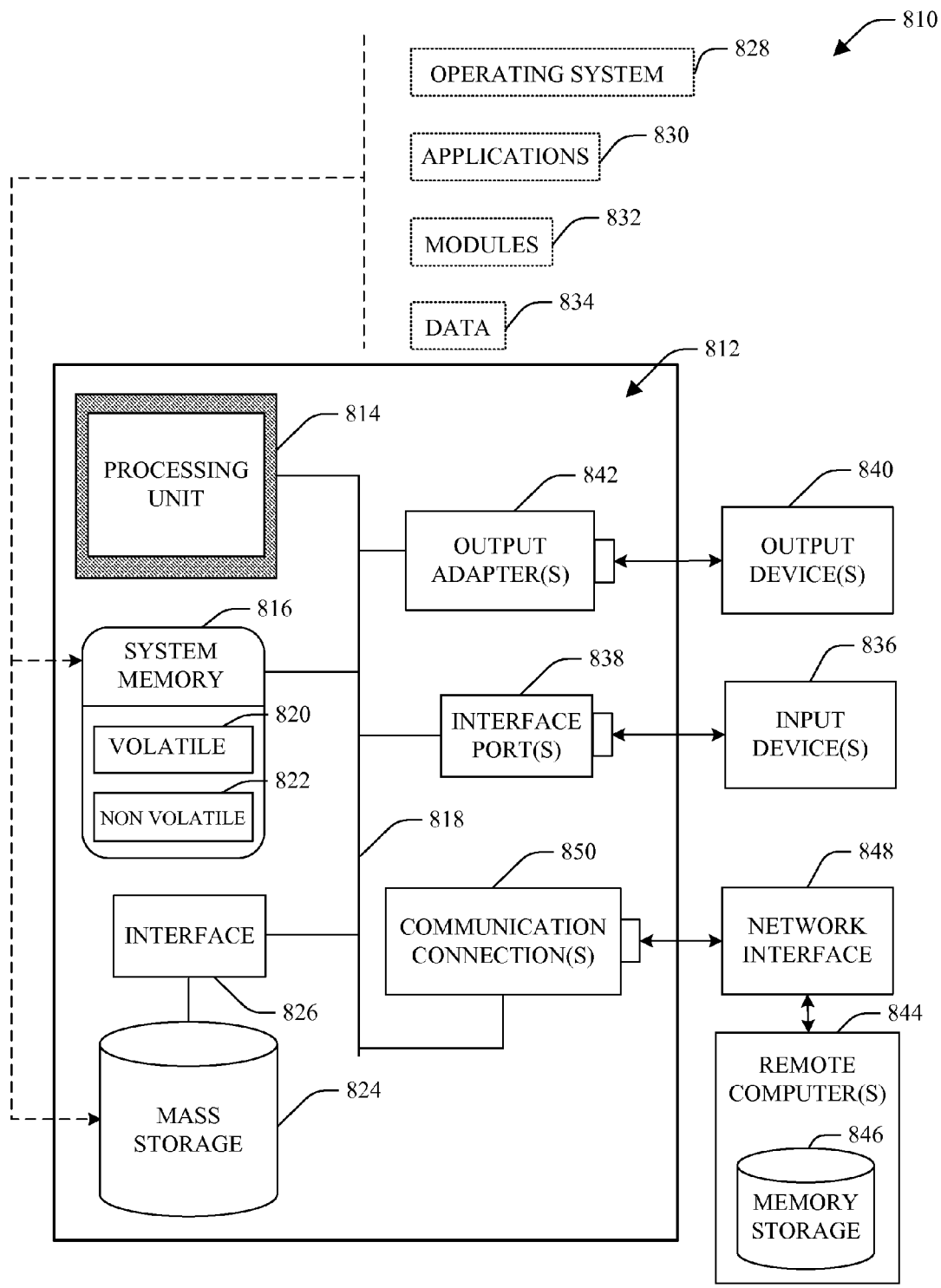
FIG. 8 illustrates an example operating environment that can be employed in accordance with the claimed subject matter.
Figure 9:
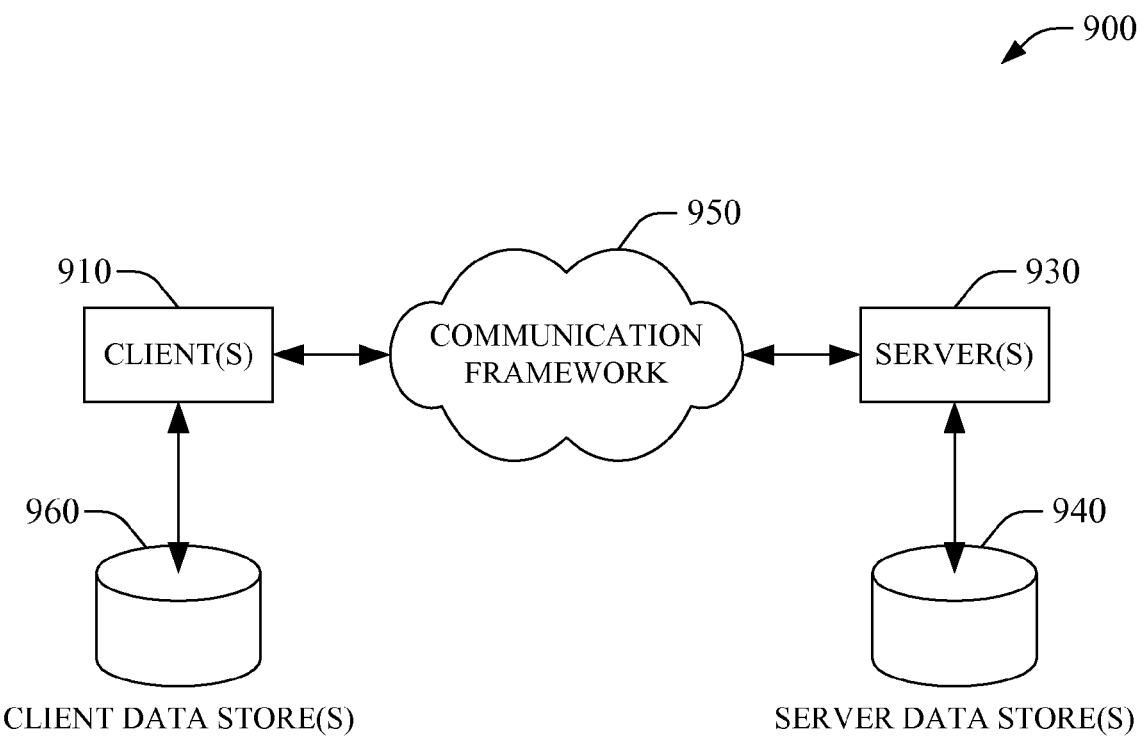
FIG. 9 illustrates an example networking environment, wherein various novel aspects of the claimed subject matter can be employed

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 8, an example environment 810 for implementing various aspects disclosed herein includes a computer 812 (e.g., desktop, laptop, server, hand held, programmable consumer or industrial electronics . . . ). The computer 812 includes a processing unit 814, a system memory 816, and a system bus 818. The system bus 818 couples system components including, but not limited to, the system memory 816 to the processing unit 814. The processing unit 814 can be any of various available microprocessors. Dual microprocessors and other multiprocessor architectures (e.g., multi-core) also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory.

Computer 812 also includes removable/non-removable, volatile/non-volatile computer storage media. FIG. 8 illustrates, for example, mass or auxiliary storage 824. Mass storage 824 includes, but is not limited to, devices like a magnetic disk drive, floppy disk drive, tape drive, Jaz drive, Zip drive, LS-100 drive, flash memory card, or memory stick. In addition, mass storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 824 to the system bus 918, a removable or non-removable interface is typically used such as interface 826.

It is to be appreciated that FIG. 8 describes software that acts as an intermediary between users and the basic computer resources described in suitable operating environment 81O. Such software includes an operating system 828. Operating system 828, which can be stored on mass storage 824 and loaded to system memory 816, acts to control and allocate resources of the system 812. System applications 830 take advantage of the management of resources by operating system 828 through program modules 832 and program data 834 stored either in system memory 816 or on mass storage 824. It is to be appreciated that the subject innovation can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836.

Thus, for example, a USB port may be used to provide input to computer 812 and to output information from computer 812 to an output device 840. Output adapter 842 is provided to illustrate that there are some output devices 840 like displays (e.g., flat panel, CRT, LCD, plasma . . . ), speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected (e.g., wired or wirelessly) via communication connection 850. Network interface 848 encompasses communication networks such as local-area networks (LAN) and wide-area networks (WAN).

Communication connection(s) 850 refers to the hardware/software employed to connect the network interface 848 to the bus 818. While communication connection 850 is shown for illustrative clarity inside computer 816, it can also be external to computer 812. The hardware/software necessary for connection to the network interface 848 includes, for example purposes only, internal and external technologies such as, modems including regular telephone grade modems, cable modems, power modems and DSL modems, ISDN adapters, and Ethernet cards or components.

FIG. 9 is a schematic block diagram of a sample-computing environment 900 with which the subject innovation can interact. The system 900 includes one or more client(s) 910. The client(s) 910 can be hardware and/or software (e.g., threads, processes, computing devices). The system 900 also includes one or more server(s) 930. Thus, system 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing the subject innovation, for example. One possible communication between a client 910 and a server 930 may be in the form of a data packet transmitted between two or more computer processes.

The system 900 includes a communication framework 950 that can be employed to facilitate communications between the client(s) 910 and the server(s) 930. The client(s) 910 are operatively connected to one or more client data store(s) 960 that can be employed to store information local to the client(s) 910. Similarly, the server(s) 930 are operatively connected to one or more server data store(s) 940 that can be employed to store information local to the servers 930. This web service server can also be communicate with a plurality of other servers 930, as well as associated data stores 940, such that it can function as a proxy for the client 910.

It should be appreciated that substantially all, or portions of, the subject innovation may be implemented as a system, method, apparatus, or article of manufacture using standard programming and/or engineering techniques to produce software, firmware, hardware or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim. Examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

What is claimed is:

1. A method for generating a parsimonious multi-resolution representation of value-item lists, the method comprising:
   receiving a set of values for a set of measure attributes and a set of values for a set of dimension attributes;
   inferring an initial hierarchic data structure based at least in part on count data associated with the received set of values for dimension attributes;
   distributing the received set of values for the set of measure attributes into a set of value-item lists associated with a portion of leaf nodes in the hierarchic data structure;
   in the hierarchic data structure recursively rearranging from bottom to top the set of value-item lists associated with the portion of leaf nodes based at least in part on compression performance stemming from the rearrangement of the set of value-item lists;
   reducing a number of features in the set of measure attributes, prior to the recursive rearrangement of the set of value-item lists; and
   promoting a plurality of value-item elements from the rearranged lists into a tree structure to generate a parsimonious representation of the inferred hierarchic data structure.

2. The method of claim 1, wherein recursively rearranging the set of value-item lists further comprises utilizing a first similarity criterion, and wherein promoting the plurality of value-item elements from the rearranged lists is performed using a second disparate criterion.

3. The method of claim 2, wherein the first and second criteria are inferred based on historic data on previously employed criteria.

4. The method of claim 1, wherein recursively rearranging the set of value-item lists includes pairing lists based at least in part on a greedy matching.

5. The method of claim 1, wherein recursively rearranging the set of value-item lists includes pairing lists based at least in part on a stochastic greedy matching.

6. The method of claim 1, wherein promoting the plurality of value-item elements from the rearranged set of value-item lists into a tree structure further comprises evaluating a level of significance for a promotion hypothesis.

7. The method of claim 6, wherein the level of significance is adjusted in Bonferroni-style, and wherein the level of significance α obeys $$\alpha(D) = 1 - 0.95^{2^{\frac{1}{(D-1)}}},$$

with D a depth in the inferred hierarchical data structure.

8. The method of claim 1, further comprising trading off semantic similarity with respect to nearness when rearranging the set of value-item lists.

9. The method of claim 8, wherein a criterion for the semantic similarity includes at least one of a Euclidean distance or a cosine similarity metric.

10. The method of claim 1, further comprising rejecting a trading off of semantic similarity and pairing the set of value-item lists through an optimal method.

11. The method of claim 1, wherein the feature reduction includes a singular value decomposition.

12. The method of claim 1, wherein the feature reduction is a Poisson decomposition.

13. The method of claim 8, further comprising performing a nearness test that constrains the pairing of the set of value-item lists to a set of lists that descend from a same predecessor at a specific depth in the tree structure.

14. The method of claim 8, further comprising performing a nearness test of the set of value-item lists with respect to centers of values for conditioning variables.

15. A computer-implemented system that facilitates generation of a parsimonious multi-resolution representation of value-item lists, comprising:
  one or more processors;
  a computer-implemented component that is executed by at least one of the processors and that recursively infers a hierarchic data structure based at least in part on a set of target variables and a set of conditioning variables; and
  a computer-implemented analysis component that is executed by at least one of the processors and that:
    prior to conducting a pairing of a set of value-item lists, performs a feature reduction for the set of target variables;
    at a step in a recursion, pairs the set of value-item lists associated with the received target variables; and
    at the step in the recursion, promotes individual elements from the paired lists into a set of lists at a next level up in a tree structure to generate a parsimonious representation of the inferred hierarchic data structure.

16. The computer-implemented system of claim 15, wherein the feature reduction comprises a Poisson decomposition.

17. The computer-implemented system of claim 15, wherein the computer-implemented analysis component includes a computer-implemented greedy clustering engine.

18. The computer-implemented system of claim 15, wherein the computer-implemented analysis component promotes the paired lists into a tree structure based at least in part on a level of significance of a promotion hypothesis.

19. The computer-implemented system of claim 18, wherein the level of significance α of the promotion hypothesis obeys $$\alpha(D) = 1 - 0.95^{2^{\frac{1}{(D-1)}}},$$

wherein D is a depth in the inferred hierarchical data structure.

20. A computer-readable storage medium storing instructions that direct a processor to perform actions for generating a parsimonious multi-resolution representation of value-item lists, the actions comprising:
  receiving a set of measure attributes;
  receiving a set of dimension attributes;
  inferring a hierarchic data structure based at least in part on the received set of measure attributes and dimension attributes;
  distributing the received set of values for the set of measure attributes into a value-item list associated with a portion of leaf nodes in the hierarchic data structure;
  recursively rearranging from bottom to top, in the hierarchic data structure, the set of value-item lists that populate a set of nodes based at least in part on compression performance stemming from the rearrangement of the one or more lists, wherein recursively rearranging the set of value-item lists includes pairing lists based at least in part on a stochastic greedy matching; and
  promoting a plurality of value-item elements from the rearranged lists into a tree structure to generate a parsimonious representation of the inferred hierarchic data structure.

* * * * *